(12) United States Patent
Dilz, Jr. et al.

(10) Patent No.: US 8,007,367 B2
(45) Date of Patent: Aug. 30, 2011

(54) MINIATURE RADAR FOR MEASURING CLUB HEAD SPEED AND TEMPO

(75) Inventors: Albert E. Dilz, Jr., Cincinnati, OH (US); Louis Born, Pasadena, MD (US)

(73) Assignee: Sports Sensors, Inc, Cincinnati, OH (US)

( * ) Notice: Subject to any disclaimer, the term of this patent is extended or adjusted under 35 U.S.C. 154(b) by 1414 days.

(21) Appl. No.: 11/140,606

(22) Filed: May 27, 2005

(65) Prior Publication Data

US 2006/0287117 A1   Dec. 21, 2006

(51) Int. Cl.
A63B 69/36 (2006.01)
(52) U.S. Cl. .................. 473/151; 473/131; 473/154
(58) Field of Classification Search ................. 473/151, 473/155, 156
See application file for complete search history.

(56) References Cited

U.S. PATENT DOCUMENTS

| | | | |
|---|---|---|---|
| 3,781,879 A | 12/1973 | Staras et al. | |
| 3,852,743 A | 12/1974 | Gupta | |
| 3,895,366 A | 7/1975 | Morris | |
| 3,896,435 A | 7/1975 | Constant | |
| 4,030,097 A | 6/1977 | Gedeon | |
| 4,163,941 A * | 8/1979 | Linn, Jr. ........................ | 324/178 |
| 4,184,156 A | 1/1980 | Petrovsky et al. | |
| 4,276,548 A | 6/1981 | Lutz | |
| 4,509,052 A | 4/1985 | Cash | |
| 4,759,219 A | 7/1988 | Cobb et al. | |
| 4,801,880 A | 1/1989 | Koike | |
| 4,915,384 A | 4/1990 | Bear | |
| 5,092,602 A | 3/1992 | Witler et al. | |
| 5,133,213 A | 7/1992 | Bernstein et al. | |
| 5,199,705 A | 4/1993 | Jenkins et al. | |
| 5,257,084 A * | 10/1993 | Marsh ............................. | 356/28 |
| 5,315,306 A | 5/1994 | Doughty et al. | |
| 5,401,026 A | 3/1995 | Eccher et al. | |
| 5,419,549 A | 5/1995 | Galloway et al. | |
| 5,471,405 A | 11/1995 | Marsh | |
| 5,486,002 A * | 1/1996 | Witler et al. .................. | 473/199 |
| 5,553,846 A | 9/1996 | Frye et al. | |
| 5,570,094 A | 10/1996 | Armstrong | |
| 5,723,786 A | 3/1998 | Klapman | |
| 5,761,096 A | 6/1998 | Zakutin | |
| 5,779,555 A | 7/1998 | Nomura et al. | |
| 5,796,354 A | 8/1998 | Cartabiano et al. | |
| 5,864,061 A | 1/1999 | Dilz, Jr. | |
| 6,079,269 A | 6/2000 | Dilz, Jr. | |

(Continued)

OTHER PUBLICATIONS

Sport Sensors, Inc., "Golf Radar: Portable Swing and Ball Speed Measurement Tool", Oct. 18, 2004, <http://web.archive.org/web/20041018082809/probablegolfinstruction.com/SwingSpeed/how-to-use-golf-radar.htm>.*

(Continued)

*Primary Examiner* — Rnald Laneau
*Assistant Examiner* — Justin Myhr
(74) *Attorney, Agent, or Firm* — Wood, Herron & Evans, LLP

(57) ABSTRACT

A golf club head swing timing device that uses radar to measure the duration of a golf swing. Club head speed measurement is also provided. The details of the disclosed embodiments include the ability of detecting the start and end of a golf swing, and to do so from information from the radar signal. Preferably, RF Doppler radar is used. Various modes of use and display are provided.

18 Claims, 3 Drawing Sheets

U.S. PATENT DOCUMENTS

| | | | |
|---|---|---|---|
| 6,292,130 B1 * | 9/2001 | Cavallaro et al. | 342/104 |
| 6,378,367 B1 | 4/2002 | Dilz, Jr. | |
| 6,437,559 B1 * | 8/2002 | Zajac et al. | 324/179 |
| 6,456,232 B1 * | 9/2002 | Milnes et al. | 342/107 |
| 6,666,089 B2 | 12/2003 | Dilz, Jr. | |
| 6,898,971 B2 | 5/2005 | Dilz, Jr. | |
| 2002/0107078 A1 * | 8/2002 | Collins | 473/152 |
| 2002/0171415 A1 * | 11/2002 | Lim | 324/176 |
| 2006/0014589 A1 * | 1/2006 | Kim | 473/233 |

OTHER PUBLICATIONS

Sport Sensors, Inc., "Swing Speed Radar", Sep. 30, 2004, <http://web.archive.org/web/20040930195236/http://probablegolfinstruction.com/SwingSpeed/swing-speed-golf-radar.htm>, p. 5.*

SimpleGolf.net website page, *Swing Mate Speed Meter*, website page dated Aug. 16, 2003.

* cited by examiner

MINIATURE RADAR FOR MEASURING CLUB HEAD SPEED AND TEMPO

This application is related to commonly assigned and U.S. patent application Ser. No. 10/740,145, filed Dec. 18, 2003, which will issue as U.S. Pat. No. 6,898,971 on May 31, 2005, hereby expressly incorporated by reference herein.

U.S. patent application Ser. No. 10/740,145 is a Continuation of U.S. Pat. No. 6,666,089, filed Dec. 3, 2001, which is a Continuation-In-Part of International Application No. PCT/US01/12535, filed Apr. 17, 2001, which claims priority to U.S. Pat. No. 6,378,367, filed Apr. 17, 2000.

U.S. Pat. No. 6,378,367 is a Continuation-In-Part of U.S. Pat. No. 6,079,269, filed Jan. 20, 1999, which is a Continuation of U.S. Pat. No. 5,864,061, filed Feb. 5, 1997, all of which are hereby expressly incorporated by reference herein.

U.S. Pat. No. 6,378,367 is also a Continuation-In-Part of U.S. patent applications Ser. No. 09/471,905, filed on Dec. 23, 1999 (which claims the benefit of U.S. Provisional Patent Application Ser. No. 60/113,378, filed on Dec. 23, 1998); and Ser. No. 09/471,906, filed on Dec. 23, 1999 (which claims the benefit of U.S. Provisional Patent Application Ser. No. 60/113,434, filed on Dec. 23, 1998) all of which are hereby expressly incorporated herein by reference.

BACKGROUND OF THE INVENTION

Improvement in the play of golf depends to a large degree on the improvement of the golfers swing. Increased distance in golf shots is known to result from increases in club head speed at the time of impact with the ball. Much effort is devoted to improvement of swing technique with a goal of increasing club head or club swing speed. Instruments have been proposed to measure the swing speed and to thereby assist the golfer by evaluating the results of the efforts to improve swing technique.

It has also appreciated that speed of the club head isn't the only factor of importance in improving a golfer's swing and improving the golfer's overall game and golf score. The rhythm of the swing also affects the energy transferred to the ball and the accuracy of the golf shot. Devices for measuring this rhythm have also been proposed.

The instruments proposed to assist the golfer in developing a golf swing have suffered from complexity and borne a high cost. This has limited their utility for the average golfer. The instruments proposed have also been difficult to operate, making it inconvenient for the golfer to use without assistance or without interrupting the practice exercise.

Accordingly, there remains a need for improved instrumentation in the measurement of swing parameters in the play and practice of golf.

SUMMARY OF THE INVENTION

In accordance with the principles of the present invention, a radar device has been provided which times the duration of a golf swing.

According to certain embodiments of the invention, radar device, preferably a Doppler radar device, is configured to detect club head speed or motion and to use the information derived from the detected motion to time the beginning and end, and hence the duration, of a golf club swing.

According to alternative or additional embodiments of the invention, a radar device and method are provided which uses a Doppler radar signal to measure both the speed of a golf club head and the duration of a golf club head swing.

These and other objectives and advantages of the present invention will be more readily apparent from the following detailed description of the illustrated embodiments of the invention, in which:

DETAILED DESCRIPTION OF THE PREFERRED EMBODIMENT

Figure 1:
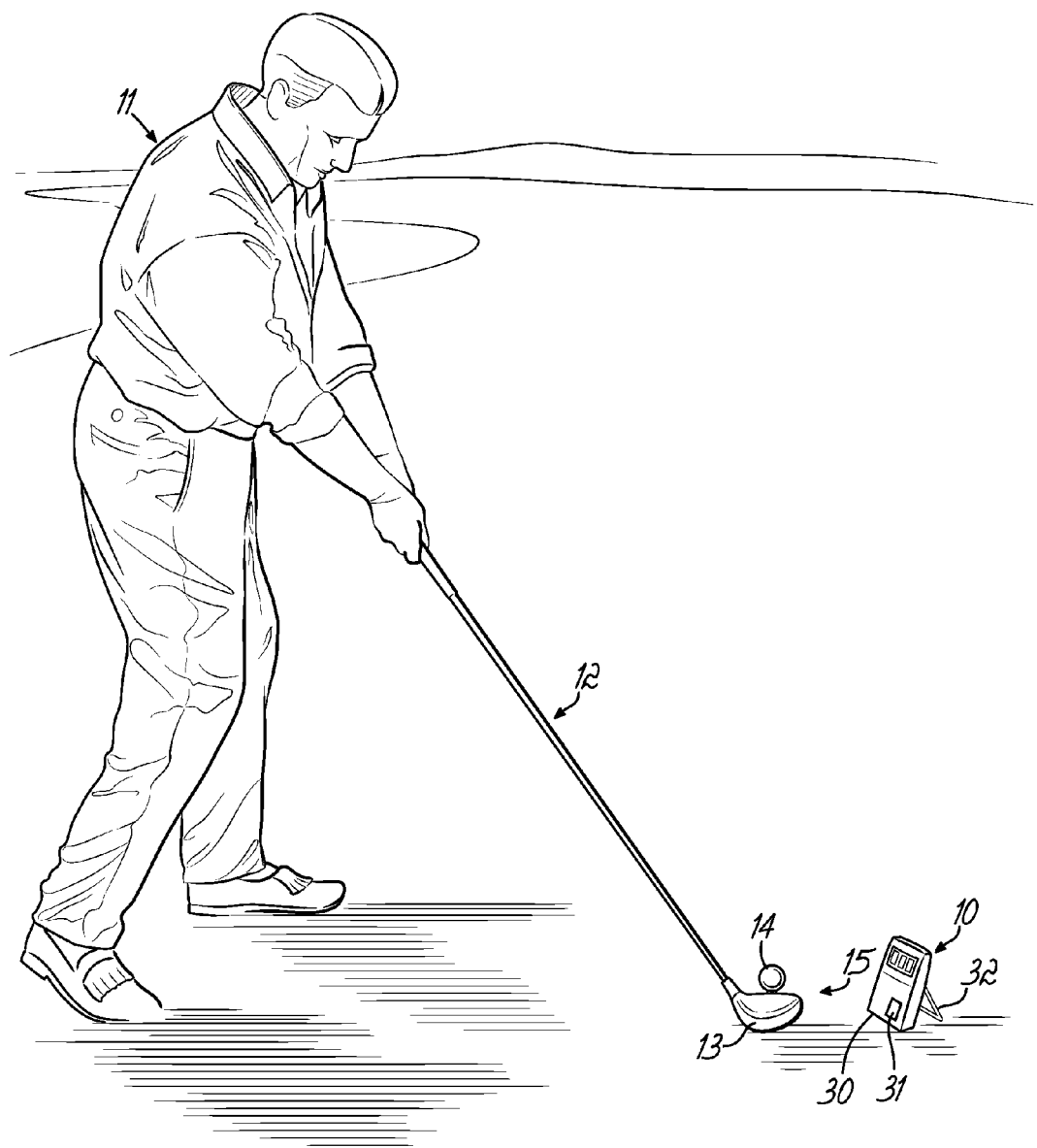
FIG. 1 is a perspective view illustrating the set up and use of a golf club swing speed measurement and swing duration timer according to an embodiment of the present invention.

FIG. 1 illustrates the use of a swing speed timer 10 by a golfer 11, according to certain principles of the present invention. The embodiment of the timer 10 that is illustrated in FIG. 1 is configured to measure the duration of the swing of a golf club 12. In certain embodiments, the timer 10 is also configured to measure the peak speed of the club head 13 of the golf club 12. When the club 12 is swung by the golfer 1, the peak speed of the club head 13 typically occurs at approximately the moment of impact of the club head 13 with a golf ball 14, or, in the case of a practice swing without a golf ball 14 present, when the club head 13 passes over the point 15 on a tee 16, or on the ground at which the golf ball 14 would normally be located.

Figure 2:
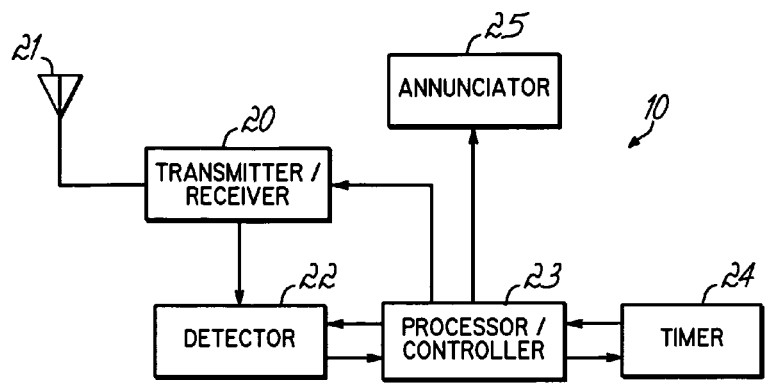
FIG. 2 is a diagram illustrating the architecture of an embodiment of the timer of FIG. 1.

A diagram of an embodiment of the architecture of the timer 10 is illustrated in FIG. 2. It includes a transmitter/receiver 20 to which is connected a transmit/receive antenna 21 from which a signal is transmitted and to which a signal is received from a moving object such as the club head 13. The timer 10 includes a speed signal detector 22 that detects a speed signal from the moving object at an input connected to the transmitter/receiver 20, a processor 23 that interprets and further processes the speed signal, a timing unit 24, and an annunciator 25.

Figure 3:
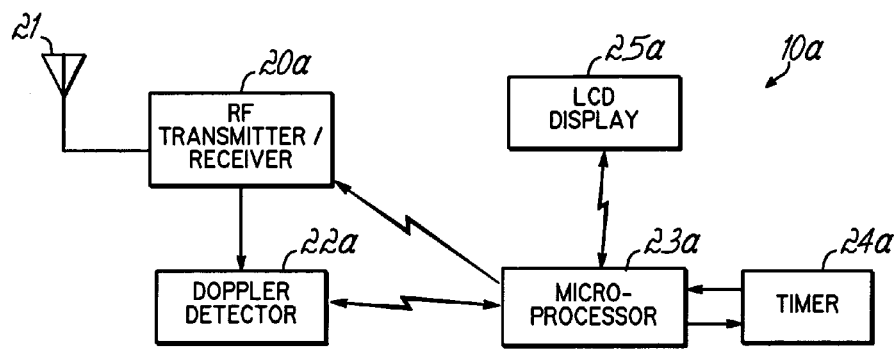
FIG. 3 is a diagram similar to FIG. 2 illustrating a more specific embodiment to the architecture of the timer of FIG. 1.

When a portion of a transmitted continuous wave signal is reflected from a club head 13 that is moving toward or away from the antenna 21, the received signal can contain a Doppler shift that is proportional to the frequency of the transmitted signal and the velocity of the club head 13 toward or away from the antenna 21, as in the timer embodiment 10a of FIG. 3. In the timer 10a, detector 22a, which has an input connected to the transmitter/receiver 20, detects the amount of the Doppler shift between the transmitted and Doppler-shifted received signals and outputs a Doppler signal to the processor 23, which may be a microprocessor 23a. The processor 23a derives information from the Doppler signal and correlates it with information from a timing unit 24a to measure the duration of the swing of the club 12 by the golfer 11. The microprocessor 23a outputs signals to the annunciator 25. The processor 23 may also derive the speed of the club head 13 and output it to the annunciator 25.

The transmitter/receiver 20 is one that transmits and receives a signal that is capable of capturing the speed of the club head 13. Preferably, it transmits and receives a continuous wave signal from which the speed of the club head can be captured by returning a Doppler signal. The continuous wave signal may be an ultrasonic signal, an electromagnetic signal or some other continuous wave signal. In FIG. 3, the embodiment of the timer 10a that is illustrated has a transmitter/receiver 20a that transmits and receives an RF signal, of which C-band and X-band signals are practical examples.

The annunciator 25 is one that converts an output signal received over a wired or wireless link from the processor 23 into a form for use or interpretation. In its simplest and most useful form, annunciator 25 converts the outputs into an audible or visual representation perceivable by the golfer 11. In the embodiment of FIG. 3, the annunciator is an LCD display 25a on which the swing duration of the club head 13 is displayed to the golfer 11 as a direct and immediate measurement of each swing of the golf club 12 by the golfer 11.

The processor 23 in the embodiment of FIG. 3 is a microprocessor 23a that is capable of interpreting the Doppler signal from the detector 22 to determine whether or not an object, namely the club head 13, in the field of the antenna 21 is moving, and if so at what speed. The interpretation that the club head 13 is moving is used to determine that the club head 13 is being pulled back from the ball 14 or point 15, and hence that a swing has begun. This determination is used by the processor 23 to start the timing circuit 24 to time the swing of the club 12. The interpretation that the club head 13 is moving is also used to validate that the swing is taking place and to distinguish a full swing of the club head 13 from minor motion of the club head 13 or a waggle of the club head 13 as when a golfer 11 is merely addressing the golf ball 14. This validation can be conducted in a number of ways. One such way can be by integrating the detected motion over a time interval. Such a time interval of, for example 0.05 or 0.10 seconds, during which continuous motion of the club head 13 may be sensed, can be used by the processor 23 to support a determination that a complete swing is taking place.

The measurement of the speed of the club head 13 can be used by the processor 23 to determine when the maximum speed of the club head 13 has been reached in a swing, to calculate what the maximum speed of the club head 13 is, and to determine the point in time when the swing of the club 12 has been completed. This end-of-swing determination can be defined as the point of contact between the club head 13 and the ball 14, and can be taken as the point in the swing at which the speed of the club head 13 is at a maximum.

The detection of motion is also useful to the processor 23 in controlling the operation of the timer 10. This enables the timer 10 to be operated by a golfer 11 or other user in a hands-off manner. For example, one embodiment of timer 10 can be operated by merely turning it on. Then, the sensing of motion of the club head 13 can be used to operate the timing unit 24 by starting a time measurement at the beginning of a swing and stopping the measurement of the swing duration at the end of a swing. The processor 23 can also determine when to enable and disable the timer 10, when to measure the speed of the club head 13, and when and how to operate the display 25a or other annunciator 25.

In FIG. 1, timer 10a is illustrated in a plastic housing 30 having a three digit LCD display 25a mounted therein and one or more user interface buttons, which, in this embodiment, include a single momentary push-button 31 on the front of the housing 30. A support leg 32 is provided on the housing 30 to allow it to be set on the ground. Within the housing 30 are battery operated components that include the transmitter/receiver 20, the antenna 21, the detector 22, the processor 23 and the timer 24. These components may be configured according to the principles set forth in detail in the related patents and applications that are identified at the beginning of this application and have been incorporated by reference herein. The display 25a and push button 32 are connected to the processor 23.

The use and operation of the timer 10 can be considered with reference to FIG. 1, where the golfer 11 can set the compact housing 30 of the timer 20 on the ground adjacent a point 15 at which a golf ball 14 or tee 16 may be located during the practice of a golf swing. The housing 30 is shown placed even with the point 15, eight to ten inches on the opposite side thereof from the golfer 11, and facing parallel or at a slight angle, preferably less than forty-five degrees, to the path of the club head 13 of the golf club 12, pointing generally toward the face of the approaching club head 13 during a swing. In this location, the timer 10 can be used to measure a golf swing when the golfer 11 is actually hitting golf balls.

Alternatively, the timer 10 can be placed directly behind the ball 14 or point 15, facing forward in the direction of the motion of the club head 13, close to the ball but sufficiently behind the ball to avoid being hit by the club head 13. As long as the transmitted power is low and the timer 10 sensitivity is carefully limited, the timer 10 can measure club head motion from this position without substantial errors due to a detecting of the motion of the golf ball. The timer 10 can also be similarly placed in front of the ball, facing the approaching club head 13, provided that no actual golf ball or other hard object is being hit. Placed in front, the timer 10 is susceptible to being hit by the golf ball which can injure the golfer 11 or damage the timer 10.

Figure 4:
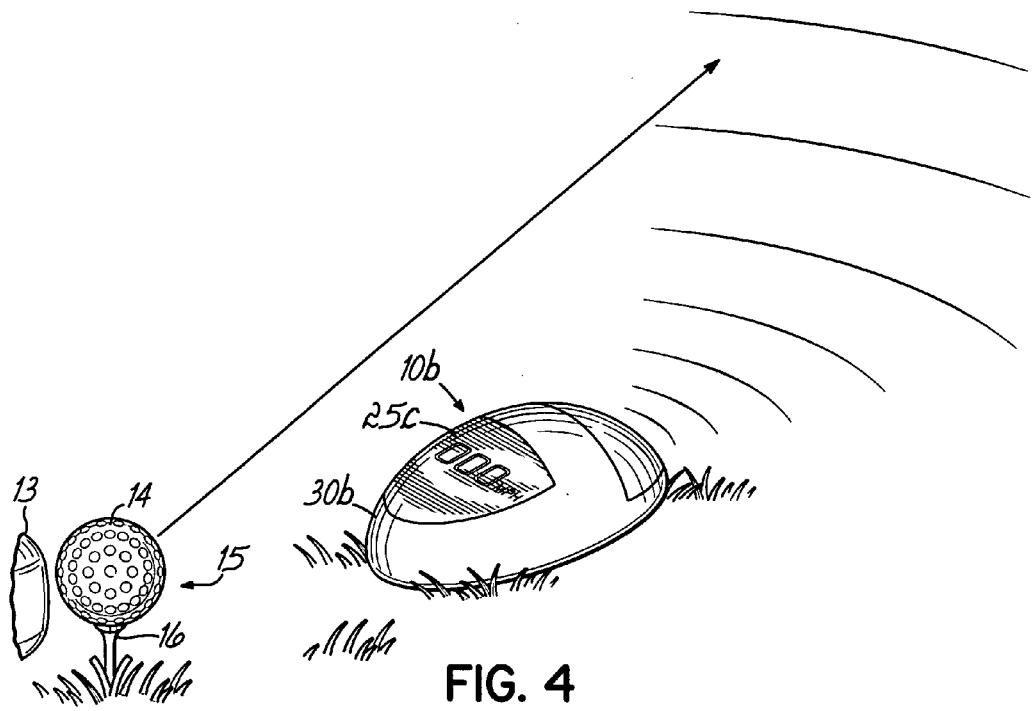
FIG. 4 is a perspective view of an alternative embodiment of the timer of FIG. 1.

A further embodiment of the timer 10 is illustrated in FIG. 4, which shows timer 10b in a housing 30b shaped to protect the timer 10b from being hit by a golf ball 14 so that the timer 10b can be used to measure the speed of the golf ball 14 being hit by the golfer. In this embodiment, the housing 30b is shaped to deflect a ball if one were to hit the housing 30b without bounding it back toward the golfer 11. The antenna 21 of the unit can be aimed toward the point 15 to measure the speed of the ball 14 leaving the tee. In this case, the swing speed can also be measured as described above. However, distinguishing club head motion and ball motion could require careful adjustment and placement to avoid erroneous measurement results. This can be avoided, particularly when measuring only the speed of a ball hit from a low-angled club head, by orienting the timer 10b so that the antenna 21 faces away from the tee toward the path of the ball.

While FIG. 4 shows the antenna 21 facing away from the tee toward the path of the ball, which would be away from the tee, toward the fairway, or the direction that the ball is traveling toward, the ball speed can either be measured with the radar antenna looking back at the ball coming off of the tee, or after the ball has traveled over the radar antenna and is moving away from it.

Alternatively, the radar antenna can be located forward of the ball, for example approximately two to three feet from the tee where it can also read the speed of the club head. The reflected signal will contain two Doppler components, one representing the speed of the club head and one representing the speed of the ball. The club head speed will be at one speed, for example 150 mph, while the ball speed might be about 30% to 50% faster than the ball speed. The two speeds can be distinguished by an appropriately configured detector and processor. Either the output of the club head speed and that of the ball speed may be output by the annunciator. Alternatively, the separate club head and ball speed readings can be toggled or alternated to display both club head and ball speed, or sent to a remote annunciator for output or to a compute for recording or analysis.

With the radar antenna on the ground in front of the tee, the ball speed is best detected when the ball is launched from the tee or other surface at a relatively shallow angle, for example, less than 12 degrees. This occurs when balls are hit by low angled woods such as drivers, rather than irons or lofted woods.

With any of the embodiments of the above, particularly the timer 10b of FIG. 4, the annunciator 25 can be an annunciator 25b located remote from the transmitter/receiver 20 or at least the antenna 21. Communication of information can include a wired or wireless link between the locations of the antenna 21 and annunciator 25. The wireless link, if used, can be placed between two components of the system or in more than one location. A wireless link between the processor and annunciator is a practical arrangement. Locating the wireless link between the transmitter and detector or between the detector and processor are also useful configurations. The annunciator 25 can be in the form of a computer or other data processing unit or output device.

Figure 5:
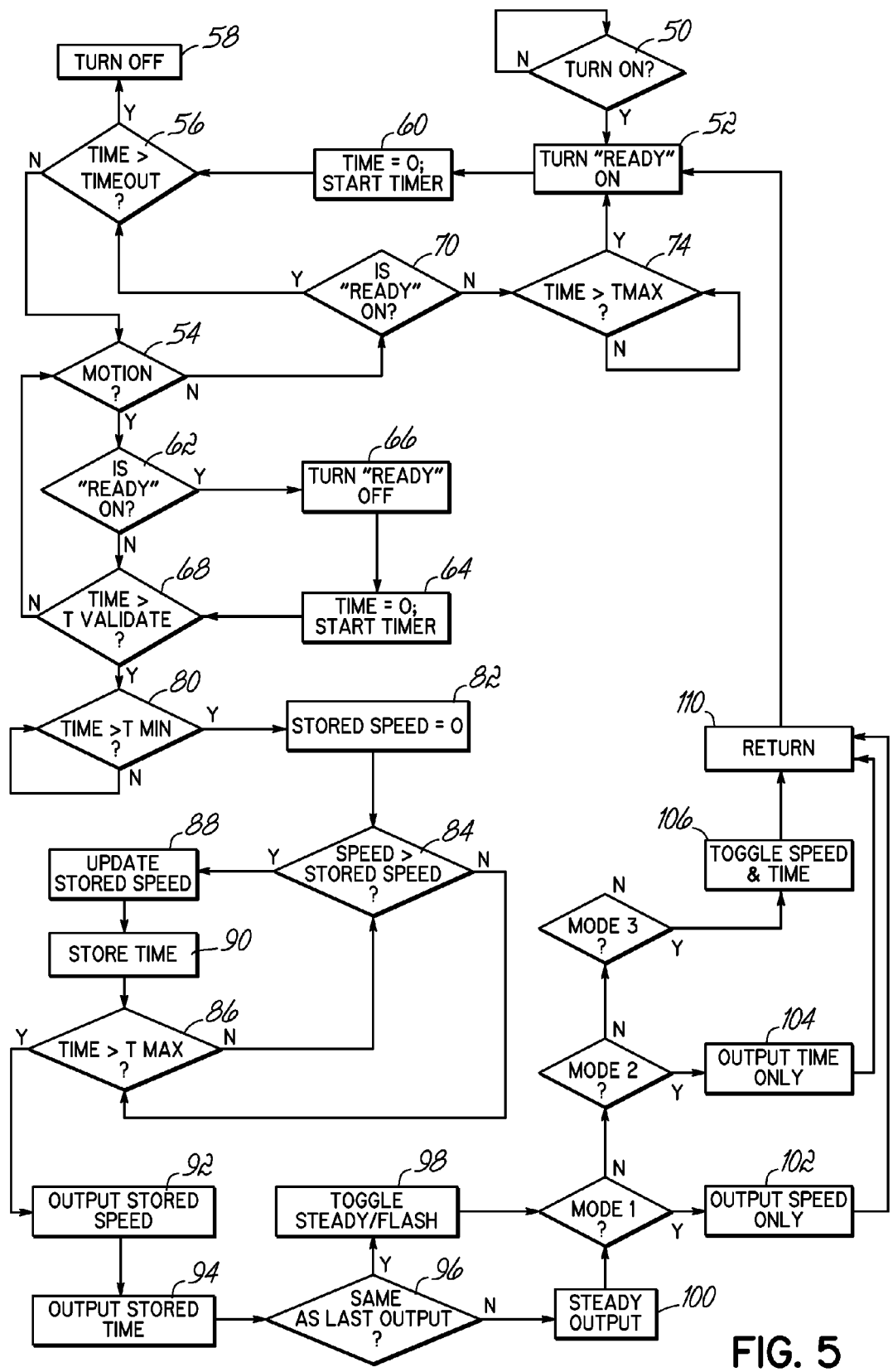
FIG. 5 is a flow chart illustrating one embodiment of the program and operation of the timers of FIGS. 1-4.

The use and operation of the timer 10 can be understood by reference to a sample flowchart as set forth in FIG. 5 in the description of which the boxes are referenced in parenthesis.

When placing the timer 10a as described above in connection with FIG. 1, the golfer 11 need only press (50) the button 31 to turn the timer 10a "on". A "ready" indicator 33 is provided on the display 25a to indicate that the timer 10a is enabled and ready to detect and measure a swing. As the unit powers up, the "ready" indicator turns on (52), the timer 24 is reset to zero (60) and proceeds to measure time from that point. When the "ready" indicator 33 is on (70), if no motion is detected (54) by the timer 10a within a timeout interval (56), of for example 5 minutes, the timer 10a is programmed to turn itself off (58). If any motion is detected (54) during this interval (56), the processor proceeds to interpret the signal.

At this point in time, the timer 10a is looking for motion in the form of a pullback of the club head 13 from the point 15, where the ball 14 would be located. If, when the timer is on and in the "ready" condition (62), any motion that is detected (54) within the field of the antenna 21 will be processed as a possible beginning of a swing. Therefore, when any Doppler signal is detected by the detector 22, the timing unit 24 is started (64) and the "ready" indicator is turned off (66). But since not every detected Doppler signal is necessarily indicative of the beginning of an actual swing, the detection of an actual swing must be validated (68). This validation is accomplished by analysis by the processor 23 of the output of the detector 22. In the described embodiment, the analysis involves determining the presence of a continuous speed signal, namely the continuous presence of a Doppler signal, for a time interval long enough to be the result of the beginning of an actual swing. Therefore, the processor 23a continues to test (68) for the presence of a Doppler signal for a period of 50 or 100 milliseconds, which is likely to be produced by the pullback of a club head 13 for one or two feet, and not produced by other motion of the club head 13, such as occurs when a golfer merely waggles the club head 13 in addressing the ball, or the golfer terminates the swing.

If, after motion is sensed (54), motion stops (54) before the validation interval has expired (68), a false start is detected. In the case of a false start, after waiting an interval (74) that is longer than that needed for a valid swing, the timing unit 24 is reset (60) and the "ready" indicator 34 is turned back on (52). In the example of FIG. 5, the resetting waits 4 seconds before a new swing can start.

If the sensed pullback of a club head is validated (68) as an actual swing by sensing the presence of a club head speed signal for the required minimum amount of time, the processor 23 ignores (80) any detected speed signal within a time interval after the start of the timer unit 24 that is less than the shortest possible swing. In the example, that is taken to be one-half second. After this minimum swing time interval (80) elapses from the sensed start of the swing (64), assuming the swing is validated as a probable full swing (68), the processor 23a stores a value for the maximum swing speed, initially at zero (82), then continues to measure the speed of any sensed motion (84) for a given period of time (86) that is longer than the longest anticipated swing duration, which is chosen as four seconds in the illustrated example. During this period, the stored value for maximum speed is replaced (88) by any measured speed that is greater than the previously stored speed. Further, whenever new maximum speed is stored (88), the value of the timer 24 is also stored (90). At the end of the given speed measurement (86), the values of maximum sensed club head speed (92) and swing duration (94) will be stored in memory to be output to the annunciator 25. The output swing duration (94) will be the length of time from when the club head pullback was first sensed (64) until the maximum club head speed was measured (88), which typically occurs at the point 15 at which the club head contacts the ball 14.

When a display 25a is the annunciator 25, numerical values for swing speed and swing duration are displayed according to the display mode selected. If two consecutive numbers to be displayed are the same (96), the display is made to switch (98) from a steady display to a flashing display so that the golfer 11 or other user knows that there has been a reading taken that is unchanged in value. When consecutive measurements differ, the values are displayed as steady readings (100). The mode of operation can be selected by the user to measure either only swing speed (102), only swing duration (104), or both (106). When both swing speed and swing timing are to be displayed, they are displayed alternately on the three digit LCD screen of the display 25a.

When new measured values have been displayed, the timer 24 returns (110) to the beginning of the program to await another swing. The timer 24 is reset to zero (60), the "ready" indicator 34 is turned on (52), and the timer 10a proceeds to the sensing of the motion (54) of the next swing to be measured. If no such motion is sensed within the maximum timeout interval (56), the timer 10 turns itself off (58). Alternatively, the timer 10 can be turned off manually by pressing the on/off button 31 when the timer is on.

Other applications of the invention can be made. Those skilled in the art will appreciate that the applications of the present invention herein are varied, and that the invention is described in preferred embodiments. Accordingly, additions and modifications can be made without departing from the principles of the invention. Accordingly, the following is claimed:

The invention claimed is:

1. A swing motion measuring device for measuring the speed and duration of a swing of a sports object that is simple, low in cost, has utility for the average amateur user, is easy to operate, and is convenient to use without assistance and without interrupting a practice exercise, the device comprising:
   a portable housing containing a battery powered transmitter-receiver, a Doppler detector and a processor;
   the transmitter-receiver being operative to transmit a radar signal and to receive said transmitted radar signal as reflected from a swinging sports object;
   the Doppler detector being coupled to the transmitter-receiver and operative to detect from said transmitted radar signal and said received reflected radar signal a Doppler speed signal representative of the speed of the swinging sports object; and the processor being coupled to the detector and programmed to process said detected Doppler speed signal and:
- to derive from said detected Doppler speed signal:
  - a swing start-time value representing a start of a swing of the sports object,
  - a maximum value of said detected Doppler speed signal, and
  - a swing end-time value responsive to the occurrence of the maximum value of said detected Doppler speed signal and representing a point for contact of the swinging sports object with a ball;
- to derive a swing-speed output signal responsive to said derived maximum value of said detected Doppler speed signal, said swing-speed output signal being representative of a speed of the swinging sports object; and
- to derive a swing-tempo output signal responsive to the derived swing start-time and the derived end-time values, said swing-tempo output signal being representative of the duration of the swing of the sports object.

2. The swing motion measuring device of claim 1 further comprising:
an output device coupled to the processor; and
the processor being operative to control the output device to annunciate sports object speed in response to the swing-speed output signal and to annunciate sports object swing duration in response to the swing-tempo output signal.

3. The swing motion measuring device of claim 2 wherein:
the output device includes a visual annunciator operative to display an image correlated to the value of sports object speed and to display an image correlated to the value of sports object swing duration.

4. The swing motion measuring device of claim 3 wherein:
the processor is operative to control the output device to alternately display the image correlated to the value of sports object speed and the image correlated to the value of sports object swing duration.

5. The swing motion measuring device of claim 1 wherein:
the transmitter-receiver is operative to transmit and receive an RF C-band or X-band signal.

6. The swing motion measuring device of claim 1 wherein:
the processor includes a timer for timing the duration of the sports object swing from the beginning to the end of the sports object swing;
the swing start-time and end-time values are in the form of signals sent to the timer; and
the processor is programmed to derive the swing start-time value by starting the timer at a time correlated to the start of the swing of the sports object, and to derive the duration of the swing of the sports object by reading the timer in response to the occurrence of the maximum value of the detected speed signal.

7. The swing motion measuring device of claim 6 wherein:
the sports object is a golf club having a club head;
the detector is a Doppler detector operative to detect the speed signal from the transmitted and received radar signals, and
the processor is programmed to process the speed signal from the detector to determine therefrom the occurrence of a pullback of the club head to derive the swing start-time value representative of the beginning of a club head backswing.

8. The swing motion measuring device of claim 6 wherein:
the detector is a Doppler detector operative to detect the speed signal from the transmitted and received radar signals, and
the processor is programmed to process the speed signal from the detector to determine therefrom an approximate ball contact time in relation to the occurrence of the maximum value of the detected speed signal to derive the swing end-time value as representative of the end of the sports object swing.

9. The swing motion measuring device of claim 1 wherein:
the sports object is a golf club having a club head; and
the processor is programmed:
- to process the speed signal to detect therefrom the beginning of a pullback of the club head;
- to time the duration of the swing from the beginning of a pullback of the club head;
- to validate the occurrence of a club head swing after the detection of the beginning of a pullback of the club head; and
- to condition at least one of the output signals on validation of the occurrence of a club head swing.

10. The swing motion measuring device of claim 1 further comprising:
an annunciator and antenna located remote from each other.

11. The swing motion measuring device of claim 1 wherein:
the processor is programmed to derive a swing-speed output signal and a swing-tempo output signal for a plurality of different swings by processing the speed signal without the need to manually reset or restart a measurement cycle.

12. The swing motion measuring device of claim 1 wherein the processor is programmed:
- to process the speed signal to detect therefrom the beginning of a swing to derive the swing start-time value;
- to time the duration of the swing from the beginning of the swing;
- to validate the occurrence of a swing after the detection of the beginning of the swing by confirming the occurrence of the maximum value of the detected speed signal within a time window following the beginning of the swing; and
- to condition at least one of the output signals on the validating of the occurrence of a swing.

13. The swing motion measuring device of claim 1 wherein:
the processor includes a timer; and
the processor is programmed to start and stop the timer in response to the speed signal.

14. The swing motion measuring device of claim 1 wherein the processor is programmed:
to condition the deriving of the swing start-time on the existence of minimum properties of the detected speed signal.

15. The swing motion measuring device of claim 1 wherein the processor is programmed:
to condition the deriving of the swing start-time on the existence of motion of the sports object over a minimum distance by integrating the detected speed signal.

16. A swing motion measuring device for measuring the duration of a swing of a sports object, the device comprising:

a transmitter-receiver operative to transmit a radar signal and to receive said radar signal when reflected from a swinging sports object;

a Doppler detector coupled to the transmitter-receiver and operative to detect from said transmitted radar signal and said received reflected radar signals a speed signal representative of the speed of the swinging sports object; and a processor coupled to the detector and programmed to process said detected speed signal and determine from said detected speed signal a start of the swing of the sports object, an end of the swing of the sports object, and time elapsed between the beginning and the end of the swing of the sports object;

the processor being programmed to determine an occurrence of a maximum value of said detected speed signal following the start of the swing and to determine the end of the swing of the sports object in response to said determined occurrence of the maximum value of the detected speed signal;

an output device;

a common housing containing the transmitter-receiver, the Doppler detector, the processor and the output device and one or more batteries for operating transmitter-receiver, the Doppler detector, the processor and the output device; and the processor being operative to control the output device to annunciate a sports object swing duration value in response to the determined elapsed time.

17. The swing motion measuring device of claim 16 wherein the processor is programmed:

to validate the occurrence of a swing after the detection of the start of the swing by confirming the occurrence of the maximum value of the detected speed signal within a time window following the start of the swing; and to condition the swing tempo output signal or the control of the output device on the validating of the occurrence of a swing.

18. The swing motion measuring device of claim 16 wherein the processor is programmed:

to condition the deriving of the swing start-time on the existence of motion of the sports object over a minimum distance by integrating the detected speed signal.

* * * * *